(12) United States Patent
Lim

(10) Patent No.: US 7,667,792 B2
(45) Date of Patent: Feb. 23, 2010

(54) LIQUID CRYSTAL DISPLAY DEVICE

(75) Inventor: Young Nam Lim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 426 days.

(21) Appl. No.: 11/638,521

(22) Filed: Dec. 14, 2006

(65) Prior Publication Data

US 2007/0153168 A1 Jul. 5, 2007

(30) Foreign Application Priority Data

Dec. 29, 2005 (KR) .................. 10-2005-0133509

(51) Int. Cl.
*G02F 1/1333* (2006.01)
(52) U.S. Cl. ..................... 349/84; 349/85; 349/110
(58) Field of Classification Search ............ 349/61–65, 349/110, 122, 84–85
See application file for complete search history.

(56) References Cited

U.S. PATENT DOCUMENTS

| | | | | |
|---|---|---|---|---|
| 6,271,823 | B1 * | 8/2001 | Gordon et al. | 345/107 |
| 6,396,621 | B1 * | 5/2002 | Sheridon | 359/296 |
| 7,133,092 | B2 * | 11/2006 | Lee et al. | 349/64 |
| 7,554,716 | B2 * | 6/2009 | Kita et al. | 359/296 |
| 2002/0163606 | A1 * | 11/2002 | Kitai et al. | 349/98 |

* cited by examiner

*Primary Examiner*—Dung T. Nguyen
(74) *Attorney, Agent, or Firm*—Holland & Knight LLP

(57) ABSTRACT

A liquid crystal display device includes a liquid crystal panel having an upper substrate and a lower substrate that face each other with a layer of liquid crystal molecules therebetween, and a liquid powder display panel at a lower surface of the liquid crystal panel for blocking light.

10 Claims, 6 Drawing Sheets

LIQUID CRYSTAL DISPLAY DEVICE

This application claims the benefit of the Korean Patent Application No. P05-0133509 filed on Dec. 29, 2005, which is hereby incorporated by reference in its entirety.

BACKGROUND OF THE INVENTION

1. Field of the Invention

Embodiments of the invention relate to display device, and more particularly to a liquid crystal display device. Although embodiments of the invention are suitable for a wide scope of applications, it is particularly suitable for improving black brightness.

2. Description of the Related Art

Generally, a liquid crystal display device displays a picture corresponding to a video signal using a matrix of liquid crystal cells, which are defined between crossing gate lines and data lines. Each pixel area includes a thin film transistor (hereinafter, referred to as 'TFT') connected to a pixel electrode, a gate line and a data line. The TFT switches a video signal from the data line through the TFT to the pixel electrode of a liquid crystal cell in response to a gate drive signal from the gate line. Further, the liquid crystal display device includes a gate drive circuit and a data drive circuit for supplying the drive signals to the gate lines and the data lines.

FIG. 1 is a schematic diagram of the related art liquid crystal display device. As shown in FIG. 1, the liquid crystal display device of the related art includes a liquid crystal panel 800 having a matrix of liquid crystal cells, a gate driver 600 for driving gate lines GL1 to GLn of the liquid crystal panel 800, a data driver 400 for driving data lines DL1 to DLm of the liquid crystal panel 800, and a timing controller 200 for controlling the gate driver 600 and the data driver 400.

The timing controller 200 generates control signals GDC and DDC, which control the gate driver and the data driver. The gate control signals GDC generated in the timing controller 200 includes a gate start pulse GSP, a gate shift clock signal GSC, and a gate output enable signal GOE. The data control signals DDC generated in the timing controller 200 includes a source start pulse SSP, a source shift clock signal SSC, a source output enable signal SOE, and a polarity control signal POL. Further the timing controller 200 supplies a pixel data signal RGB to the data driver 400.

The gate driver 600 sequentially supplies scan signals to the gate lines GL1 to GLn in response to the gate control signals GDC. Thin film transistors along one horizontal line are driven for a horizontal period in response to the scan signal of the gate driver 600. The gate lines GL1 to GLn can receive the scan signals in sequence.

The data driver 400 converts the inputted pixel data into an analog pixel signal and supplies the analog pixel signals of one horizontal line to the data lines DL1 to DLm for each horizontal period while the scan signal is supplied to the gate line GL along the horizontal line. In the alternative, the data driver 400 can convert the pixel data into the analog pixel signal by use of gamma voltages supplied from a gamma voltage generating part (not shown).

The liquid crystal panel 800 includes an upper substrate (not shown) and a lower substrate (not shown) that face each other with a layer of liquid crystal molecules (not shown) therebetween. The upper substrate includes color filters (not shown), a black matrix (not shown) located between the color filters (not shown), and a common electrode (not shown) that supplies a reference voltage to the layer of liquid crystal molecules (not shown). Further, the lower substrate includes a thin film transistor 120 which is formed in each sub-pixel area defined by the crossing of the gate lines GL1 to GLn and the data lines DL1 to DLm, and a pixel electrode 100 connected to the thin film transistor 120. In response to scan signals from the gate line GL1 to GLn, the thin film transistor 120 supplies the pixel signal from the data line DL1 to DLm to the pixel electrode 100. The pixel signal on the pixel electrode 100 drives the layer of liquid crystal molecules between the common electrode and the pixel electrode 100 to control light transmittance through the layer of liquid crystal molecules toward a color filter.

The liquid crystal display device of the related art has one pixel that is a combination of sub-pixels, which are disposed in parallel to realize red R, green G and blue B colors. Each of the red R, green G and blue B sub-pixels makes only allows about 27%~33% of the amount of the light from the backlight unit BL exit to the upper substrate. Thus, light from the backlight unit BL may not be fully utilized.

The liquid crystal display device is mainly classified into a TN (twisted nematic) mode in which an electric field oriented in a vertical direction between the substrates is used to drive the liquid crystal molecules, and an IPS (in-plane switch) in which an electric field oriented in a horizontal direction between the substrates is used to drive the liquid crystal molecules. In the TN mode, the liquid crystal molecules are driven by a vertical electric field between the common electrode, which is disposed on the upper substrate, and the pixel electrode, which is disposed on the lower substrate. The TN mode has the advantage of a high aperture ratio but has the disadvantage of a narrow viewing angle. In the IPS mode, the liquid crystal molecules are driven by a horizontal electric field between the pixel electrode and the common electrode, which are both disposed in parallel on the lower substrate. The IPS mode has the advantage of a wide viewing angle but the disadvantage of a low aperture ratio.

FIG. 2 is a diagram representing a cross-section of one sub-pixel in the related art IPS mode liquid crystal panel. More particularly, FIG. 2 is a diagram representing a cross-section of one sub-pixel in the related art IPS mode liquid crystal panel 800 shown in FIG. 1. As shown in FIG. 2, a black matrix 2, a color filter 6, an overcoat layer 7, a spacer 13 and an upper alignment film 8 are sequentially formed on a surface of the upper substrate 1 and a transparent electrode material (not shown) is formed on the other surface of the upper substrate 1 to prevent static electricity. A thin film transistor, a common electrode 4, a pixel electrode 100 and a lower alignment film 10 are formed on a lower substrate 5. Liquid crystal molecules (not shown) are injected into a space between the upper plate and the lower plate.

The black matrix 2 is formed to overlap a TFT area of the lower substrate 5, gate line areas and data line areas (not shown). The black matrix defines a cell area 'A' where a color filter 6 is to be formed. The black matrix 2 prevents light leakage and absorbs an external light so as to increase contrast.

The color filter 6 is formed over and the black matrix 2 and within the cell area 'A'. Further, the color filter 6 is formed for each of red (R), green (G), and blue (B) colors to realize R, G, and B colors. An overcoat layer 7 is formed to cover the color filter 6 for planarization purposes. An upper alignment film 8 is formed on the overcoat layer 7. The upper/lower alignment films 8 and 10 are formed by spreading an alignment material, such as polyimide, and performing a rubbing process. A spacer 13 maintains a cell gap between the upper substrate 1 and the lower substrate 5.

The TFT, including a gate electrode 16, is formed on the lower substrate 5 together with the gate line (not shown), a semiconductor layer 126, which overlaps the gate electrode with a gate insulating film 129, and source/drain electrodes 128 and 130 formed together with the data line (not shown) with the semiconductor layer 126 therebetween. The TFT supplies the pixel signal from the data line to the pixel electrode 100 in response to the scan signal from the gate line. The pixel electrode 100 is a transparent conductive material through which light transmittance is high. The pixel electrode contacts the drain electrode 130 of the TFT.

The common electrode 4 is formed in a stripe shape to alternate with the pixel electrode 100. A common voltage being a reference when driving liquid crystal is supplied to the common electrode 4. The liquid crystal is rotated on the basis of a horizontal direction by a horizontal electric field created by the common voltage and a pixel voltage supplied to the pixel electrode 100.

In the liquid crystal panel 800, the light applied from a backlight (not shown) mounted on a lower part of the liquid crystal panel passes through the color filter 6 through the cell area 'A' where the pixel electrode 100 and the common electrode 4 are formed, thereby generating R, G, and B colors. The amount of the light passing through the cell area 'A' is controlled by the rotation of the liquid crystal molecules, which results from the electric field supplied to the common and pixel electrodes 4 and 100, as described above.

FIG. 3 is a diagram representing a state of light leakage in a related art IPS mode liquid crystal panel. As described above, the amount of light passing through the cell area 'A' is controlled by the rotation of the liquid crystal molecules due to the electric field between the pixel electrode 100 and the common electrode 4. The response speed of the liquid crystal molecules is slower than the switching speed of the electrodes, thus the liquid crystal molecules of the cell area 'A' do not completely block the light applied from the backlight, as shown in FIG. 3, thereby causing the problem of black brightness.

In general, the response speed of liquid crystal molecules is 5~10 ms, and the response speed cannot be as fast as the switching speed of the electrodes. Thus, a problem occurs in that a very high black brightness appears because the light of the backlight is not completely blocked and a part of the light is transmitted during a black state in which all of the light of the cell area 'A' should be blocked. Such a phenomenon is more pronounced in the IPS mode liquid crystal display device where the common electrode 4 and the pixel electrode 100 are formed in parallel on the lower substrate.

The reason why such a problem is more pronounced in the related art IPS mode liquid crystal display device is because the black brightness cannot be counteracted by a strong reverse electric field since the black color is the initial alignment state for the related art IPS mode liquid crystal display device. In other words, when going to black in the related art IPS mode liquid crystal display device, the related art liquid crystal panel does not change to completely block the light, but rather lets part of the light from a backlight unit through. Accordingly, there is a problem in that the black brightness of the related art liquid crystal panel in the related art IPS mode liquid crystal display device is increased.

SUMMARY OF THE INVENTION

Accordingly, embodiments of the invention are directed to a liquid crystal display device that substantially obviates one or more of the problems due to limitations and disadvantages of the related art.

An object of the invention is to provide a liquid crystal display device having reduced black brightness.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other objects of the invention, a liquid crystal display device according to an aspect of the invention a liquid crystal panel having an upper substrate and a lower substrate that face each other with a layer of liquid crystal molecules therebetween, and a liquid powder display panel at a lower surface of the liquid crystal panel for blocking light.

In another aspect, a liquid crystal display device includes a liquid crystal panel having cell areas defined by a black matrix, and a liquid powder display panel at a lower surface of the liquid crystal panel for blocking light, wherein the liquid powder display panel includes first electrodes with openings corresponding to the cell areas.

In yet another aspect, a liquid crystal display device includes a liquid crystal panel having an upper substrate and a lower substrate that face each other with a layer of liquid crystal molecules therebetween, a black matrix defining a cell area in the liquid crystal panel, an upper plate formed of a transparent material adhered to the lower substrate, a first electrode on the upper plate, a lower plate formed of a transparent material, a second electrode on the lower plate having an opening corresponding to the cell area, a separation film between the upper and lower plates for maintaining a gap between the upper and lower plates, and black particles positioned between the upper and lower plates.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Figure 1:
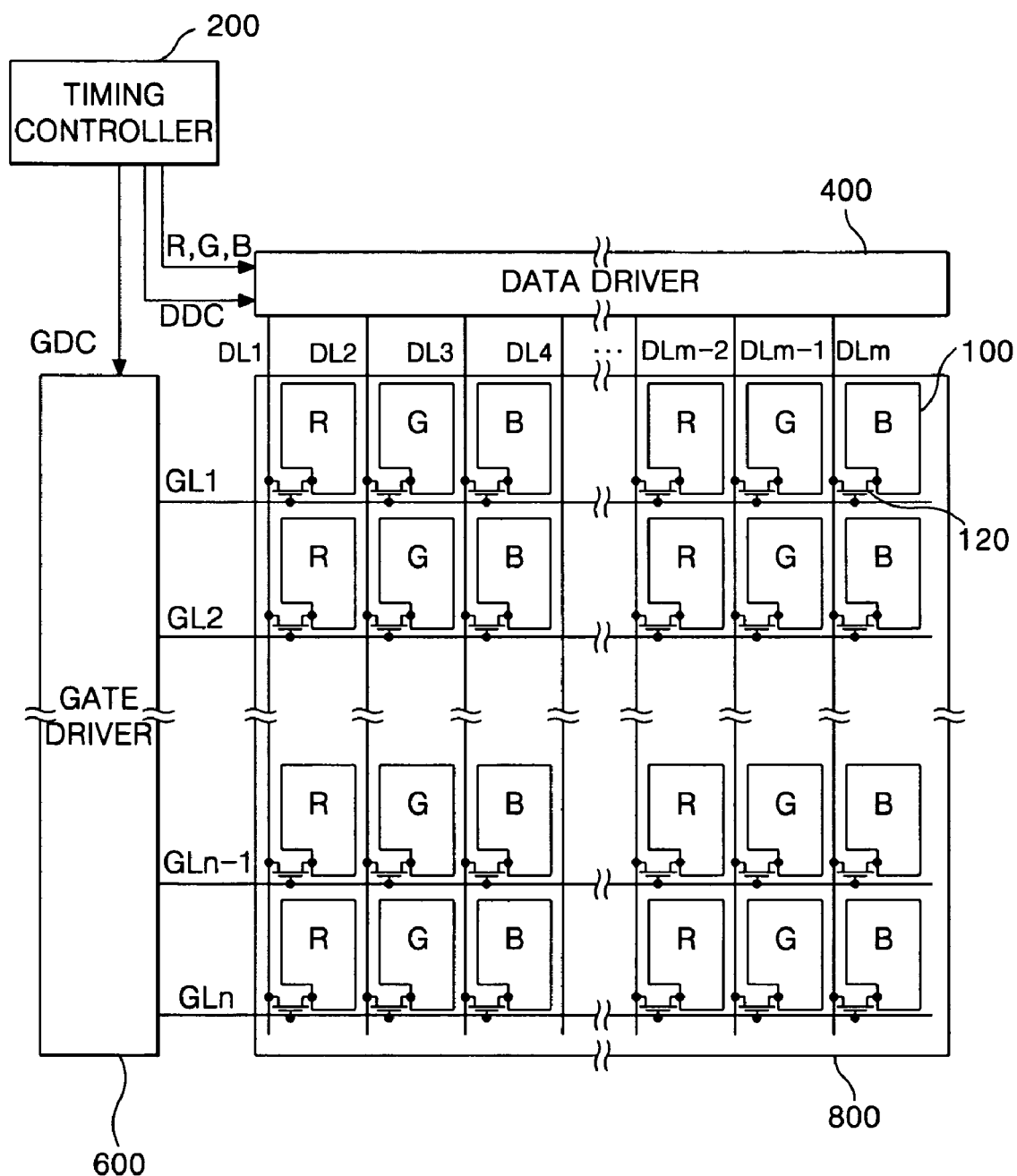
FIG. 1 is a schematic diagram of the related art liquid crystal display device.
Figure 2:
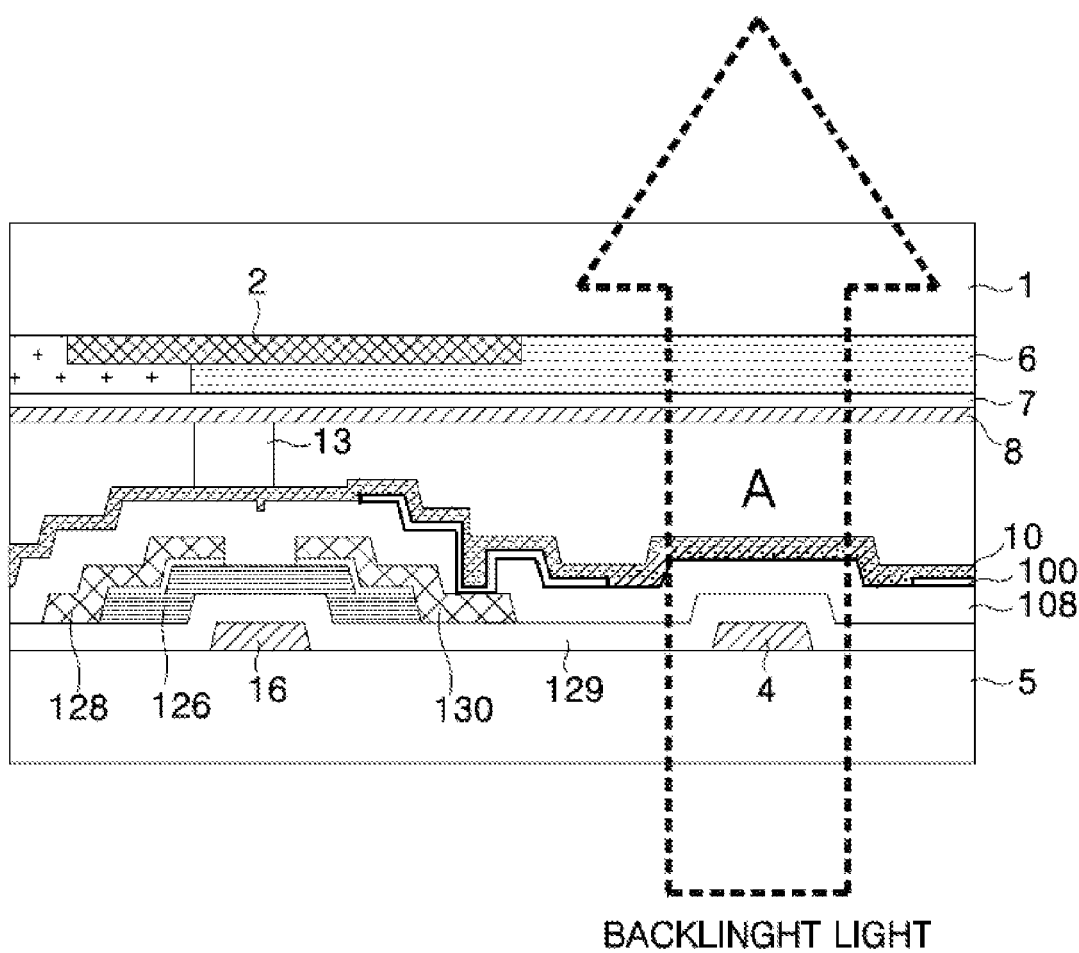
FIG. 2 is a diagram representing a cross-section of one sub-pixel in the related art IPS mode liquid crystal panel.
Figure 3:
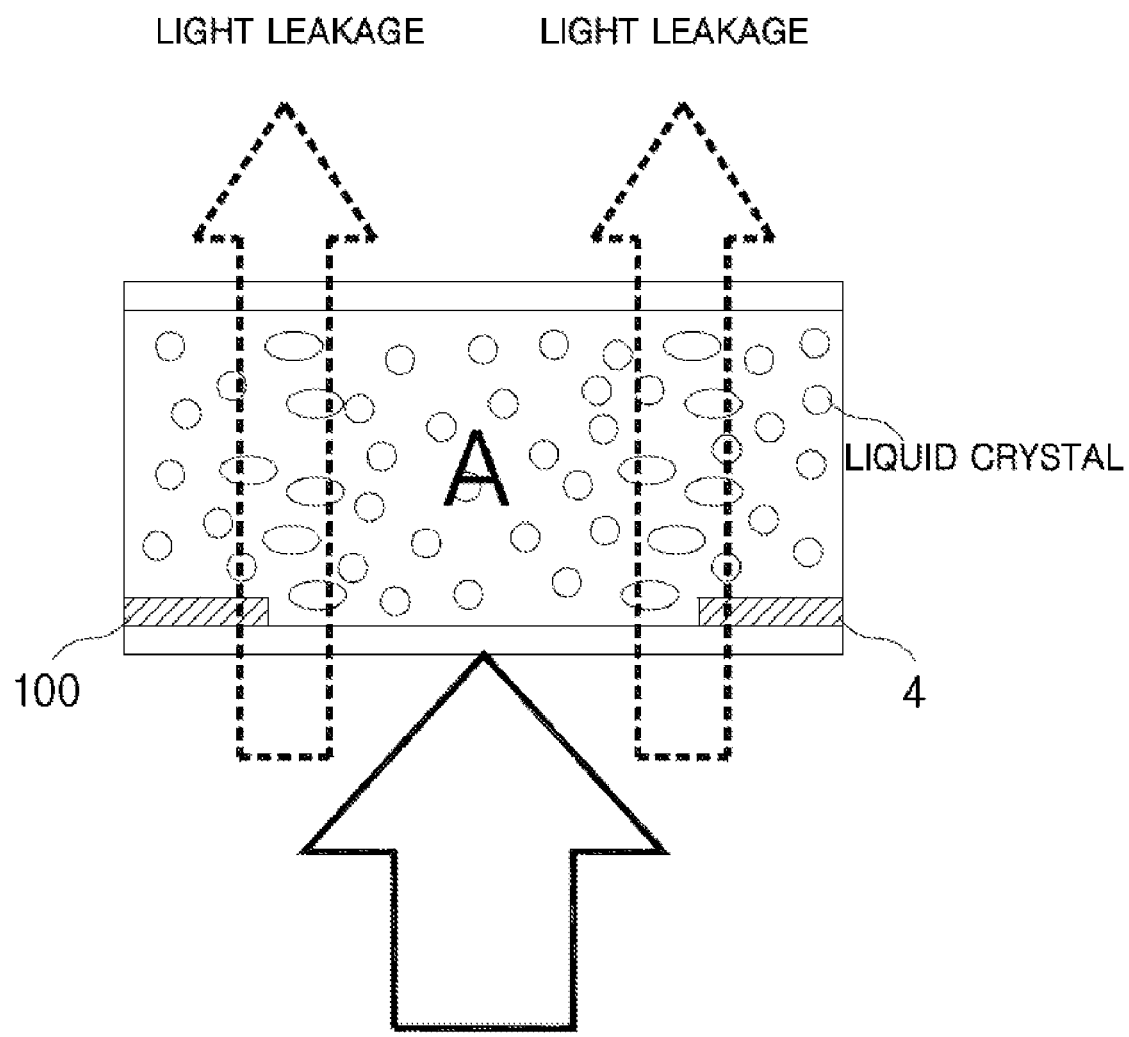
FIG. 3 is a diagram representing a state of light leakage in a related art IPS mode liquid crystal panel.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 4:
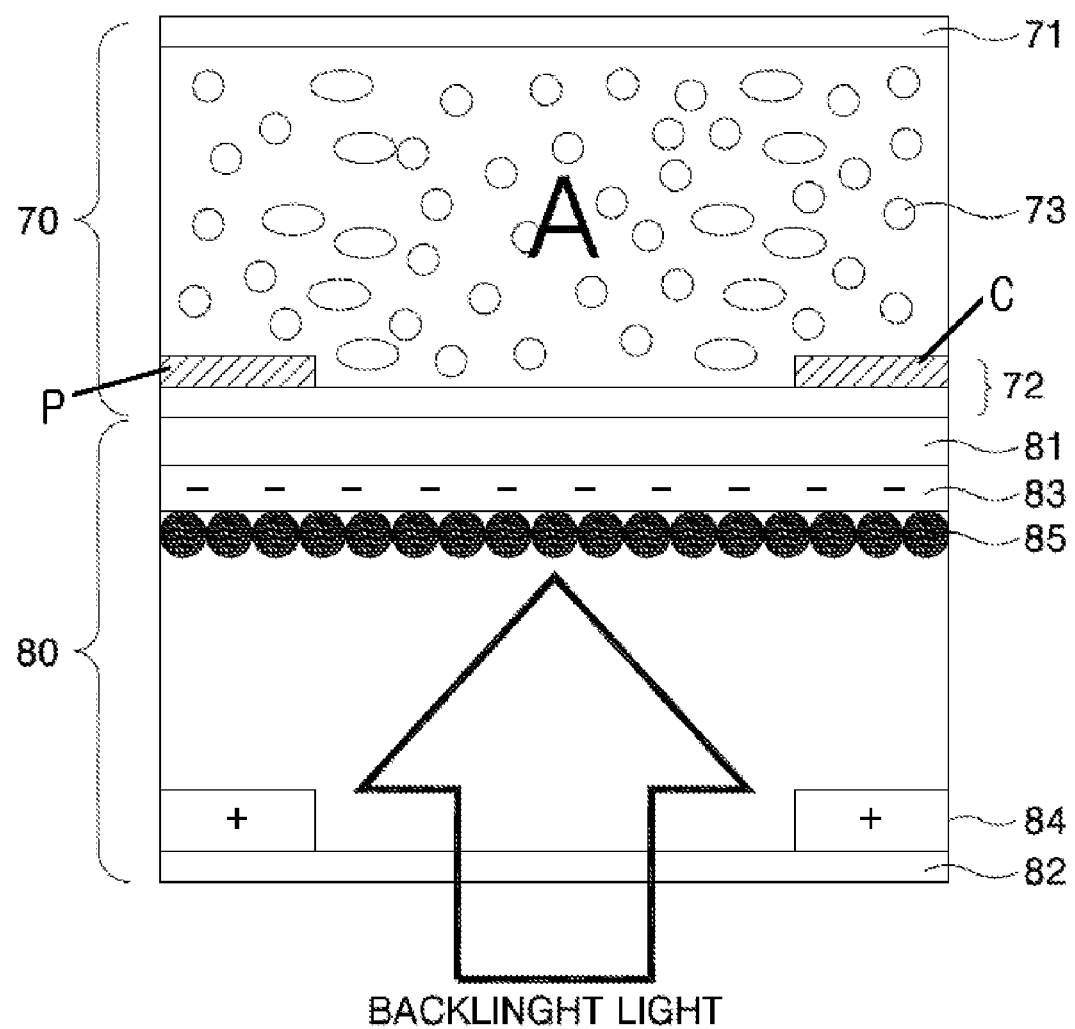
FIGS. 4 and 5 are cross-sectional diagrams representing light transmission states in a display panel of a liquid crystal display device according to an embodiment of the invention.
Figure 5:
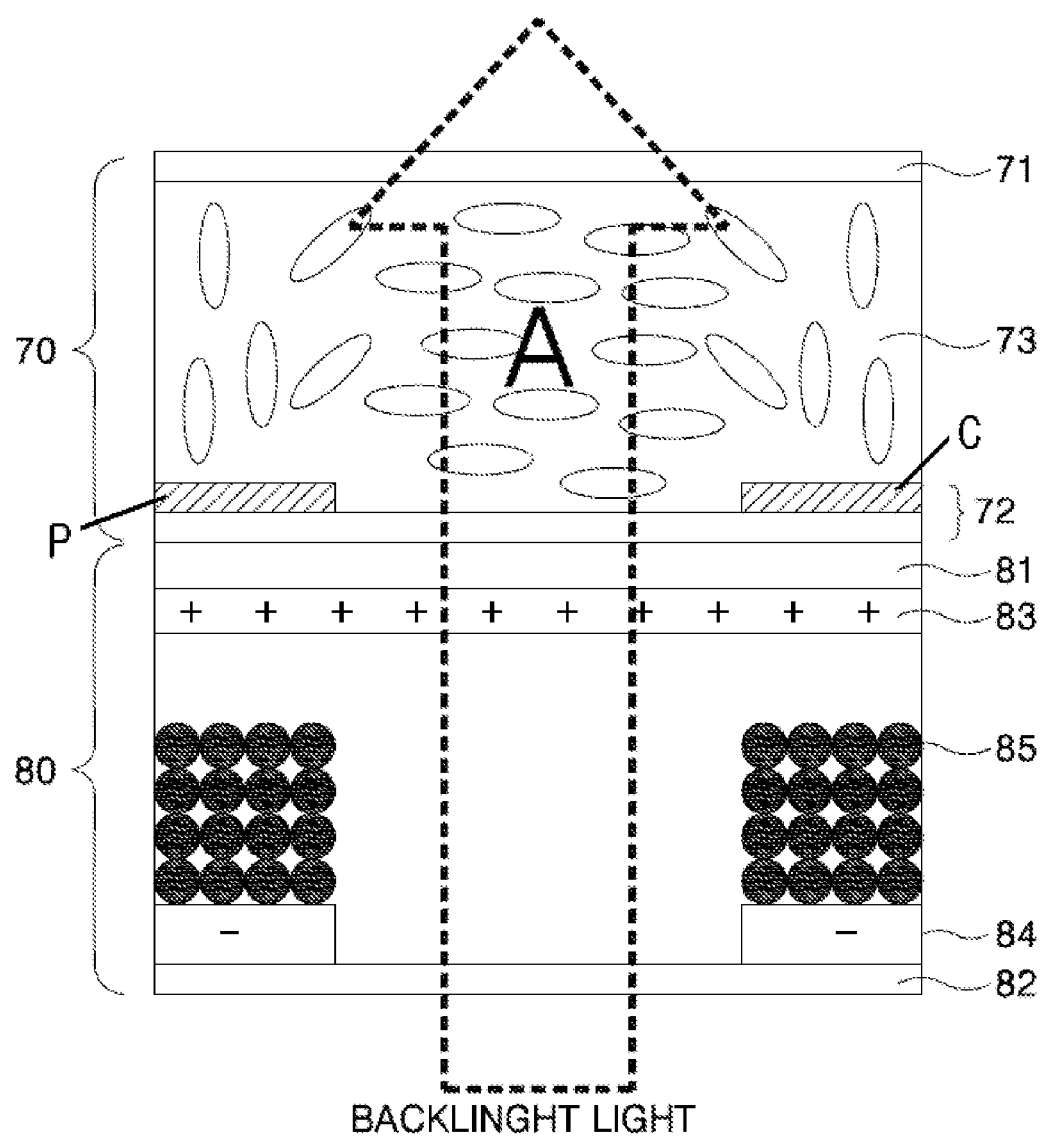

FIGS. 4 and 5 are cross-sectional diagrams representing light transmission states in a display panel of a liquid crystal display device according to an embodiment of the invention. FIG. 4 is an exemplary diagram representing a cross-section of the display panel in a state of light blockage. FIG. 5 is an exemplary diagram representing a cross-section of the display panel in a state of light passage.

The liquid crystal display device according to embodiments of the invention includes a display panel having a gate driver (not shown) for driving gate lines GL1 to GLn (not shown) of the liquid crystal display panel, a data driver (not shown) for driving data lines DL1 to DLm (not shown) of the liquid crystal display panel, and a timing controller (not shown) for controlling the gate driver and the data driver. The display panel includes a liquid crystal panel 70 and a liquid powder display panel 80, which is adhered to the rear surface of the liquid crystal panel 70 and is made of black particles so that the light of the backlight going toward the liquid crystal panel can be completely blocked upon black driving. The display panel, including the liquid crystal panel 70 and the liquid powder display panel 80, has pixels that each includes red (R), green (G) and blue (B) sub-pixels. FIGS. 4 and 5 represent a cross-section of one sub-pixel in the display panel.

The liquid crystal panel 70 is an IPS mode liquid crystal panel. An upper plate 71 of the liquid crystal panel 70 includes a black matrix (not shown), a color filter (not shown), an overcoat layer(not shown), a spacer (not shown), and an upper alignment film (not shown) formed on ones surface of an upper substrate (not shown) while a transparent electrode material (not shown) for preventing static electricity is formed on the other surface of the upper substrate (not shown). A lower plate 72 of the liquid crystal panel 70 includes a thin film transistor (not shown), a common electrode C, a pixel electrode P and a lower alignment film (not shown). Liquid crystal molecules 73 are positioned in an inner space between the upper plate 71 and the lower plate 72. The light of the backlight transmits through a cell area 'A' of the liquid crystal panel 70 between the common electrode and the pixel electrode, which are formed in the lower plate 72, and then passes through the color filter of the upper plate 71, thereby expressing the R, G, and B colors corresponding to the color filters.

The liquid powder display panel 80 includes a plastic upper plate 81 formed of a transparent plastic material, an upper electrode 83 formed of an indium tin oxide ITO film, which is transparent and conductive, is adhered to a lower surface of the plastic upper plate 81, a plastic lower plate 82 formed of the transparent plastic material in the same manner as the plastic upper plate 81, a lower electrode 84, which is formed corresponding to the common electrode C and the pixel electrode P, is formed on the plastic lower plate 82 facing the upper electrode 83, and black particles 85 positioned in a space between the plastic upper plate 81 and the plastic lower plate 82.

The black particles 85 between the plastic upper plate and the plastic lower plate rapidly respond in accordance with the polarity change of the upper electrode 83 and the lower electrode 84, thereby making it possible to transmit or block the light of the backlight, which is applied from the lower part of the plastic lower plate 82. The liquid powder display panel 80 has a response speed of about 1 ms, which is relatively fast in comparison with the 5~10 ms response speed of the liquid crystal molecules. The black particles 85 have a positive polarity.

When a sub-pixel of the liquid crystal panel 70 is turned into a state of light blockage, a corresponding sub-pixel of the liquid powder display panel 80 is driven to completely block light from a backlight, thereby reducing the black brightness. By driving sub-pixels of the liquid powder display panel 80 corresponding the sub-pixels of the liquid crystal panel 70 to reduce black brightness, the contrast of the liquid crystal panel 70 is improved. A driving method of the liquid crystal display device according to an embodiment of the invention having such a configuration will be explained in reference to FIGS. 4 and 5.

As shown in FIG. 4, when a sub-pixel of the liquid crystal panel 70 is turned off to realize a black state, a negative (−) voltage is applied to the upper electrode 83 within the liquid powder display panel 80 and a positive (+) voltage is applied to the lower (edge) electrode 84 to a corresponding sub-pixel of the liquid powder display panel 80. The positive black particles 85 within the liquid powder display panel 80 adhere to the upper electrode 83 at a speed, which is faster than the response speed of the liquid crystal molecules. Accordingly, most of the light from a backlight is blocked by the liquid powder display panel 80, as shown in FIG. 4. Accordingly, the light applied from the backlight does not reach the corresponding sub-pixel of the liquid crystal panel 70. Thus, the amount of the light leaking through the liquid crystal panel 70 is reduced and the liquid crystal display device shows high contrast.

As shown in FIG. 5, when a sub-pixel of the liquid crystal panel 70 is turned to an on-state to realize a white or gray state, a positive (+) voltage is applied to the upper electrode 83 within the liquid powder display panel 80 and a negative (−) voltage is applied to the lower electrode 84 to a corresponding sub-pixel of the liquid powder display panel 80. The positive black particles 85 within the liquid powder display panel 80 adhere to the lower electrode 84 at a speed, which is faster than the response speed of the liquid crystal molecules. Accordingly, the light applied from the backlight passes can then pass through the liquid powder display panel 80 and the cell area 'A' of the liquid crystal panel 70.

Figure 6:
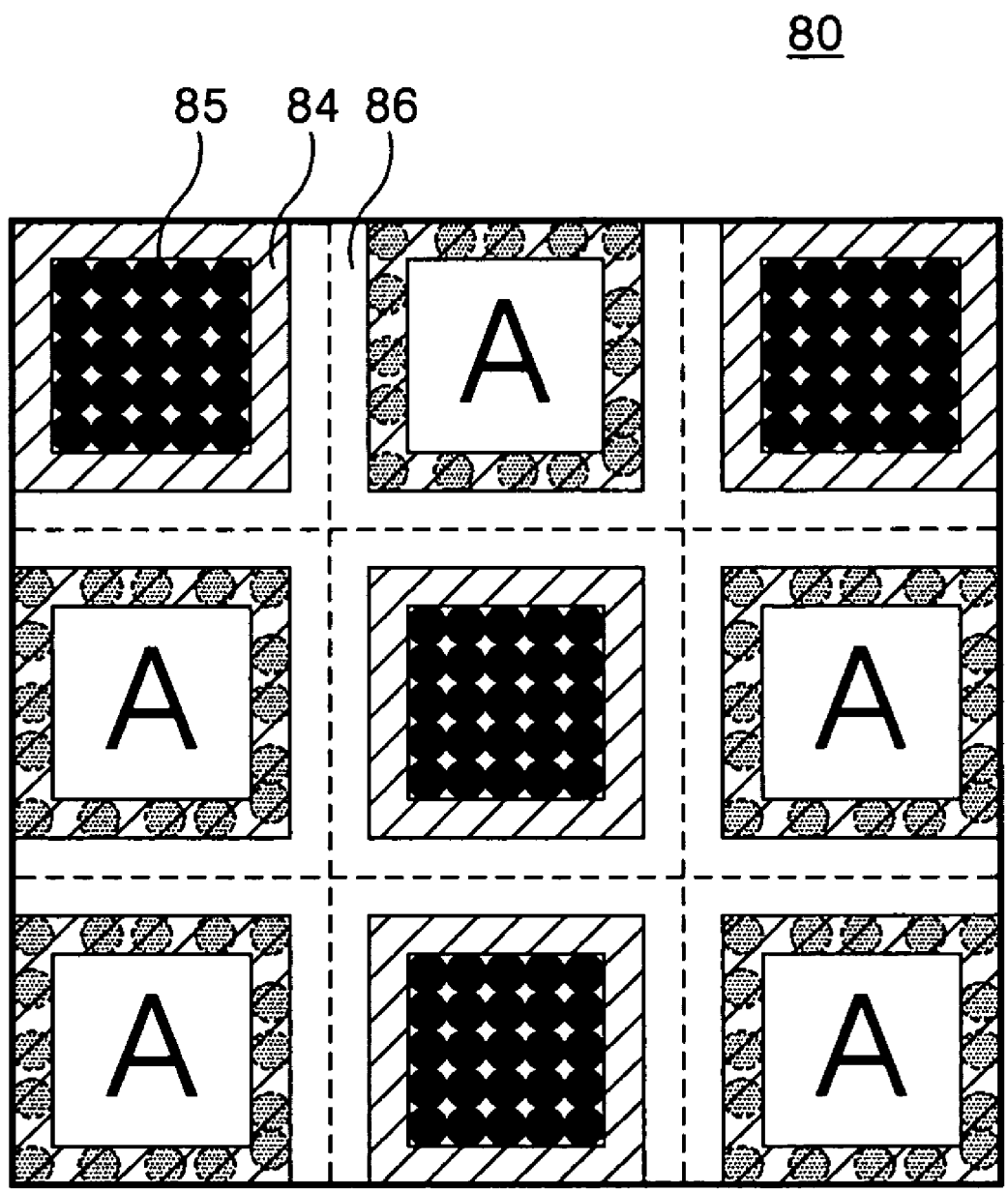
FIG. 6 is a plan view of the liquid powder display panel of the liquid crystal display device according to an embodiment of the invention.

FIG. 6 is a plan view of the liquid powder display panel of the liquid crystal display device according to an embodiment of the invention. In the liquid powder display panel 80 applied to the liquid crystal display device according to embodiments of the invention, the sub-pixels shown in FIGS. 4 and 5 are arranged in a matrix shape, as shown in FIG. 6. The black particles 85 and the lower electrode 84 of the liquid powder display panel 80 are also shown in FIG. 6. Further, the cell areas 'A' of the liquid crystal panel 70, as explained in FIGS. 4 and 5, are also shown in FIG. 6. Each of the sub-pixels for the liquid crystal display panel 70 is either R, G, or B. The upper electrode 83 of the liquid powder display panel 80 is formed to lay over the entire area inclusive of the lower electrode 84. The lower electrode 84 is formed to correspond to the periphery of the cell area 'A'. Thus, the cell area 'A' corresponds to an opening in the lower electrode 84.

As shown in FIG. 6, a state of light blockage for a sub-pixel is when that the black particles 85 are distributed within the cell area 'A', as described in FIG. 4. And, an on-state to realize a white or gray state is when the black particles 85 are gathered at the periphery of the cell area 'A' such that the light of the backlight passes through the cell area 'A' to the liquid crystal panel 70, as described in FIG. 5. In other words, the black particles can be moved to either block light or allow light through sub-pixels of the liquid powder display panel 80 that correspond to sub-pixels of the liquid crystal display panel 70.

A separation film 86 can be formed between adjacent lower electrodes 84, as shown in FIG. 6. The separate film 86 is a cell wall for maintaining black particles 85 within each sub-pixel of the liquid powder display panel and for maintaining a gap between the upper and lower electrodes 83 and 84. The separation film 86 has a square lattice shape that surrounds the upper electrodes 83 to prevent cross-talk amongst the upper electrodes 83 of the liquid powder display panel 80. Further, the square lattice shape of the separation film 86 can also surround lower electrodes 84 to prevent cross-talk amongst the lower electrodes 84 of the liquid powder display panel 80. Because the separation film 86 is positioned to correspond to the black matrix the liquid crystal display panel 70, it is possible to prevent light leakage from other parts other than the sub-pixel of the liquid powder display panel 80 for the cell area 'A'. As described above, the liquid crystal display device decreases black brightness with a liquid powder display panel that can respond at a high speed, thereby improving contrast.

It will be apparent to those skilled in the art that various modifications and variations can be made in the liquid crystal display device of embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display device, comprising:
    a first panel having an upper substrate and a lower substrate that face each other with a layer of liquid crystal molecules therebetween; and
    a second panel at a lower surface of the liquid crystal panel, wherein the second panel includes a plurality of black particles and first and second electrodes driving the black particles, and
    wherein the black particles blocks light when the first panel displays a black gray and allow to transmit the light when the first panel displays a white or other gray except the black gray.

2. The liquid crystal display device according to claim 1, further comprising:
    a first plurality of sub-pixels in the first panel; and
    a second plurality of sub-pixels in the second panel, wherein the first plurality of sub-pixels correspond to the second plurality of sub-pixels.

3. The liquid crystal display device according to claim 2, further comprising: a separation film between the second plurality of sub-pixels.

4. The liquid crystal display device according to claim 2, wherein the second panel includes:
    an upper plate formed of a transparent material;
    the first electrode on the upper plate;
    a lower plate formed of a transparent material;
    the second electrode on the lower plate; and
    the black particles between the upper and lower plates having a faster response speed to an electric field than the liquid crystal molecules.

5. The liquid crystal display device according to claim 4, wherein the first electrode is transparent.

6. The liquid crystal display device according to claim 4, wherein the black particles have a positive polarity.

7. The liquid crystal display device according to claim 1, further comprising:
    a black matrix on the upper substrate of the first panel;
    a cell area in the first panel defined by the black matrix, wherein the cell area corresponds to an opening in the second electrode.

8. The liquid crystal display device, comprising:
    a liquid crystal panel having an upper substrate and a lower substrate that face each other with a layer of liquid crystal molecules therebetween;
    a black matrix defining a cell area of each sub-pixel in the liquid crystal panel;
    an upper plate formed of a transparent material adhered to the lower substrate;
    a first electrode on the upper plate;
    a lower plate formed of a transparent material;
    a second electrode on the lower plate having an opening corresponding to the cell area;
    black particles between the upper and lower plates and moving by the first and second electrodes; and
    a cell wall for maintaining the black particles within each sub-pixel.

9. The liquid crystal display device according to claim 8, wherein the black particles have a faster response speed to an electric field than the liquid crystal molecules.

10. The liquid crystal display device according to claim 8, wherein the black particles have a positive polarity.

* * * * *